United States Patent Office 3,507,784
Patented Apr. 21, 1970

3,507,784
HYDROREFINING CATALYST PREPARATION
AND THE USE THEREOF
Mark J. O'Hara, Prospect Heights, Ill., assignor to
Universal Oil Products Company, Des Plaines, Ill.,
a corporation of Delaware
No Drawing. Filed Apr. 22, 1968, Ser. No. 723,277
Int. Cl. C10g 23/02; B01j 11/82
U.S. Cl. 208—216          2 Claims

ABSTRACT OF THE DISCLOSURE

Hydrorefining of heavy hydrocarbon charge stocks containing organo-metallic compounds and asphaltenes is carried out with a catalyst of alumina-silica-boron phosphate carrier composited with nickel and molybdenum. The catalyst preparation involves separate calcining steps wherein the dried, impregnated carrier material is (1) initially calcined in an oxygen-containing atmosphere at 500–900° F. until the impregnated nickel compound is decomposed and (2) further calcined at a higher temperature at 900–1200° F.

Applicability of invention

The present invention resides in the general area of catalysis; more specifically, the invention herein described is directed toward a particular catalyst manufacturing technique designed to increase the activity of a particular type of catalytic composite for effecting a particular reaction. As such, my invention is especially adaptable for use in the preparation of hydrorefining catalysts, containing metallic components from Groups VI–B and VIII of the Periodic Table, andp rimarily for the hydrorefining of asphaltenic hydrocarbonaceous charge stocks including petroleum crude oils, shale oil extracts, heavy cycle stocks, vacuum tower bottoms product, tar sands oil, atmospheric tower bottoms product, coal oil extracts, etc., all of which are broadly classified in the petroleum art as "black oil." The present invention affords a process for hydrorefining heavy hydrocarbon charge stocks for the primary purpose of effecting a substantial decrease in the quantity of nitrogenous and sulfurous compounds, and provides additional, unexpected advantages through the effective removal of organo-metallic contaminants, and in the conversion of a greater proportion of the heptane-insoluble asphaltenic hydrocarbons into more valuable soluble hydrocarbon products.

Petroleum crude oils, and the heavier hydrocarbon fractions and/or distillates which may be derived therefrom, generally contain nitrogenous and sulfurous compounds in relatively large quantities. In addition, petroleum crude oil is contaminated by the inclusion therein of detrimental quantities of organo-metallic contaminants having the tendency to exert deleterious effects upon catalytic composites which are employed in various processes to which the crude oil or heavy hydrocarbon fraction may be subjected. The most common metallic contaminants are nickel and vanadium, although other metals including iron, copper, etc., may be present. These metals may occur within the crude oil in a variety of forms; generally, however, they exist in the form of organo-metallic compounds, such as metal porphrins and various derivatives thereof. In addition to the organo-metallic compounds, petroleum crude oils contain greater quantities of sulfurous and nitrogenous compounds than are found in the lighter hydrocarbon fractions including gasoline, kerosene, middle-distillate gas oils, etc. For example, a vacuum tower bottoms, having a gravity of about 7.0° API at 60° F., will contain up to about 4.0% by weight of sulfur, 6000 p.p.m. of total nitrogen and over 450 p.p.m. of metallic contaminants. The nitrogenous and sulfurous compounds may be at least in part converted, on being subjected to a treating or hydrorefining process, into hydrocarbons, ammonia, and hydrogen sulfide, the latter being readily removed from the system in a gaseous phase. The reduction in the concentration of the organo-metallic compounds is not achieved with great ease, and especially to the extent that the crude oil may be subjected to acceptable, further processing, particularly in a catalytic system. Notwithstanding that the total concentration of such organo-metallic compounds is relatively small, for example, often less than about 10 p.p.m., calculated as elemental metals, subsequent processing techniques will be adversely affected thereby. For example, when a topped petroleum crude oil having a concentration of organo-metallic compounds in excess of about 10.0 p.p.m., is subjected to a catalytic cracking process for the primary purpose of producing lower-boiling components, the metals become deposited upon the catalyst employed, steadily increasing in quantity until such time as the composition of the catalytic composite is changed to the extent that undesirable results are obtained. Similarly, the catalytic composite utilized in a hydrorefining process, for the purpose of effecting the destructive removal of the nitrogenous and sulfurous compounds, experiences a composition change with the net result that the catalyst loses its required degree of activity.

In addition to the organo-metallic compounds, and sulfurous and nitrogenous compounds, petroleum crude oils consist of a particular fraction which is predominantly heptane-insoluble material. For example, the vacuum bottoms product previously described consists of about 24.0% by weight of insoluble asphaltenes. These compounds are of a heavy hydrocarbonaceous nature, possessing an extremely high molecular weight, and function as coke-precursors. Since the deposition of large quantities of coke represents a significant loss of charge stock, it is economically desirable to convert such asphaltenes into useful hydrocarbon oil fractions. In addition to affecting a high degree of removal of nitrogenous compounds, sulfurous compounds and virtually eliminating the organo-metallic compounds, the process of the present invention, hereafter described in greater detail, affords the additional advantage of converting heptane-insoluble material into heptane-soluble material. It will be readily recognized that the overall effect is to increase the volumetric yield of liquid product by the amount of insoluble asphaltenes which are converted into the more valuable soluble hydrocarbon products.

Objects and embodiments

An object of the present invention is to provide a method for preparing a hydrorefining catalytic composite. Closely allied to this object is the intent to produce a catalytic composite having unusual propensity for converting insoluble asphaltenes into lower-boiling, soluble hydrocarbon products.

Another object is to afford a catalytic composite which permits acceptable utilization of a fixed-bed hydrorefining process, which type of process was heretofore not considered feasible due to the virtually immediate deposition of coke accompanied by the rapid deactivation of the catalyst employed.

A specific object is to provide a process, utilizing a particularly-prepared catalyst, the normally liquid effluent from which is significantly decreased in sulfur and nitrogen content.

Therefore, a broad embodiment of my invention involves a method of preparing a hydrorefining catalyst which comprises the steps of: (a) initially preparing a calcined refractory inorganic oxide carrier material; (b) impregnating said calcined carrier material with a decomposable compound of a metal selected from Groups VI–B and VIII of the Periodic Table; (c) drying the resulting impregnated composite; (d) calcining the dried composite, to decompose said decomposable compound, at a temperature not more than 200° F. higher than the decomposition temperature of said decomposable compound; and, (e) increasing the calcination temperature, after said decomposable compound is substantially decomposed, to a level more than 200° F. higher than the decomposition temperature.

A more specific embodiment provides a process for hydrorefining a hydrocarbonaceous charge stock containing organo-metallic compounds and asphaltenes, which process comprises reacting said charge stock and hydrogen at a temperature above about 500°° F. and a pressure above about 500 p.s.i.g., and in contact with a catalytic composite prepared by the method of: (a) initially preparing a calcined carrier material containing alumina, silica and boron phosphate; (b) impregnating said calcined carrier material with an aqueous mixture of nickel nitrate hexahydrate and molybdic acid; (c) drying the resulting impregnated composite; (d) calcining the dried composite at a temperature within the range of 500° F. to 900° F. and at a level not more than about 200° F. higher than the decomposition temperature of nickel nitrate hexahydrate; and, (e) increasing the calcination temperature, after substantially complete decomposition of said nickel nitrate hexahydrate, to a level within the range of from 900° F. to about 1200° F.

Summary of invention

An essential feature of the present invention involves the particular method of preparing a hydrorefining catalytic composite, having unusual activity for converting asphaltenic material. The method utilizes a refractory inorganic oxide as the carrier material for the catalytically active metallic components, which catalytic composite permits effecting the hydrorefining process as a fixed-bed system, as a moving bed process, or a slurry-type process; its major utility resides, however, in the fixed-bed system. Through the use of this catalyst, the hydrorefining process yields a liquid hydrocarbon product significantly more suitable for further processing without experiencing the degree of difficulties otherwise resulting from the presence of the foregoing described contaminating influences. The process of the present invention is particularly advantageous for effecting the removal of organo-metallic compounds without significant product yield loss, and simultaneously converts heptane-insoluble material into heptane-soluble liquid hydrocarbon product; the catalyst of the present invention effects a degree of removal of nitrogenous compounds heretofore unobtainable due to the difficulty which present-day hydrorefining catalysts exhibit with respect to this particularly desired function when the charge stock also contains metallic contaminants and a significant amount of asphaltenes. Furthermore, the process of the present invention results in a greater degree of conversion to lighter-boiling hydrocarbon products.

From the foregoing described embodiments, it will be noted that the method of the present invention involves the preparation of a catalytic composite utilizing those metals selected from Groups VI–B and VIII of the Periodic Table. Metals from Groups VI–B and VIII of the Periodic Table are intended to include those indicated on the Periodic Chart of the Elements, published by Fisher Scientific Company, 1953. The catalytic composite, prepared by the method described herein, can be characterized as comprising a metallic component possessing hydrogenation activity, which component is composited with a refractory inorganic oxide carrier material which may be of either synthetic or natural origin. The precise composition and method of manufacturing the carrier material is not considered to be an essential element of the present process, although a siliceous carrier, such as 88.0% by weight of alumina and 12.0% by weight of silica; 63.0% alumina and 37% silica; or, 68.0% alumina, 10.0% silica and 22.0% boron phosphate are generally preferred for processes designed to convert black oils. Thus, the catalytic composite may comprise one or more metallic components from the group of molybdenum, tungsten, chromium, iron, cobalt, nickel, platinum, palladium, iridium, osmium, rhodium, ruthenium, and mixtures thereof. The concentration of the catalytically active metallic component, or components, is dictated by the particular metal as well as the physical and chemical characteristics of the black oil charge stock.

The refractory inorganic oxide carrier material may comprise alumina, silica, zirconia, magnesia, titania, boria, strontia, hafnia, and mixtures of two or more including silica-alumina, alumina-silica-boron phosphate, silica-zirconia, silica-magnesia, silica-titania, alumina-zirconia, alumina-magnesia, alumina-titania, magnesia-zirconia, titania-zirconia, magnesia-titania, silica-alumina-zirconia, silica-alumina-magnesia, silica-alumina-titanina, silica-magnesia-zirconia, silica-alumina-boria, etc. It is preferred to utilize a carrier material containing at least a portion of silica, and preferably a composite of alumina, silica and boron phosphate, with alumina being in the greater proportion.

An essential feature of the inventive concept encompassing the present invention resides in the method of preparing the hydrorefining catalytic composite. Briefly, the catalytic composite is prepared by initially forming a calcined carrier material comprising one or more refractory inorganic oxides including alumina, silica, thoria, boria, strontia, hafnia, zirconia, etc. The preferred carrier material comprises a composite of alumina and from about 10.0% to about 90.0% by weight of silica, based upon the dry weight of alumina and silica, to which a composite boron phosphate is subsequently combined. The alumina-silica carrier material may be prepared by coprecipitating the silica and alumina at a pH in the range of about 8.0 to about 10.0, or more, to form a hydrogel. The hydrogel is then reslurried in an aqueous solution of phosphoric and boric acids, the latter being utilized in a mol ratio of approximately 1:1, and in a total amount to yield a finished carrier material preferably containing from about 13.0% to about 35.0% by weight of boron phosphate, on a dry basis. Following a drying technique at a temperature within the range of about 200° F. to about 400° F., or a spray drying procedure at a higher temperature level, the boron phosphate-containing carrier material is formed into the particularly desired size and/or shape and subsequently calcined in an atmosphere of air at a temperature within the range from about 800° F. to about 1400° F., or higher. A more detailed description of preparing the preferred refractory inorganic oxide carrier material is found in my United States Patent No. 3,294,659 (Cl. 208–251).

The catalytically active metallic components may be composited with the carrier material in any suitable manner through the use of the well-known impregnating technique, which technique produces a very effective catalyst. The impregnation of the carrier material is most readily effected through the utilization of suitable water-soluble compounds of the desired metal or metals, and such suitable compounds include, although not by way of limitation, molybdic acid, chloroplatinic acid, ammonium molybdate, ammonium tungstate, dinitrito-diimino platinum, chloropalladic acid, nickel nitrate hexahydrate, cobalt nitrate hexahydrate, nickel chloride, cobalt chloride, etc. Where two or more metallic components are utilized, they may be incorporated in a single, or a successive impregnation with or without intermediate relatively low temperature drying. The final catalytic composite will contain from about 4.0% to about 30.0% by weight of a Group VI–B metal, and from about 1.0% to about 6.0% by weight of a Group VIII metal.

As hereinbefore set forth, the inventive concept is founded upon recognition of the effect which the manufacturing procedure (especially following the preparation of the calcined carrier material) has upon the activity of the final catalyst for converting asphaltenic material. After the refractory carrier material, for example, a composite of 68.0% alumina, 10.0% silica and 22.0% boron phosphate, has been dried and calcined, an impregnating technique is employed to incorporate one or more of the previously described metallic components. By way of illustration the carrier may be impregnated with an aqueous solution of nickel nitrate hexahydrate and molybdic acid, in quantities sufficient to produce a finished catalyst containing 2.0% by weight of nickel and about 16.0% by weight of molybdenum. The impregnated composite is dried, in a rotating evaporator, at a temperature below about 260° F. and preferably at about 210° F. When the greater proportion of physically-held water has been removed—the composite is "visually" dry—the temperature is elevated to a level of from 500° F. to 900° F., which temperature results in the decomposition of nickel nitrate hexahydrate, but is not more than 200° F. higher than the decomposition temperature. This initial calcination, generally conducted in an oxygen atmosphere, in the case of nickel nitrate hexahydrate and molybdic acid, is conveniently effected at 700° F. This temperature is maintained until the nickel nitrate hexahydrate is substantially, completely decomposed. An indication of the decomposition is the presence of nitrogen oxides in the evolved gases; when nitrogen oxides no longer are evolved, the decomposition is considered complete. The temperature is then elevated to the level normally considered sufficient for high-temperature calcination, and within the range of from 900° F. to about 1200° F. A period of from one to about four hours, at the elevated temperature, generally is sufficient for the final calcination step.

Although not essential to the preparation method of the present invention, it is understood that the finished, calcined catalyst may be subsequently treated for the purpose of converting the nickel and molybdenum (existing as oxides following the calcination technique) to any desired form. For example, a treatment in an atmosphere of hydrogen sulfide will result in the sulfides of nickel and molybdenum being present in the finished catalyst.

The hydrorefining process is effected by reacting the asphaltene-containing crude oil, or other heavy hydrocarbon mixture, and hydrogen in contact with a catalytic composite prepared as hereinbefore set forth. The charge stock and hydrogen mixture is heated to the operating temperature above 500° F., and preferably within the range of from about 650° F. to about 850° F., and contacts the catalyst under an imposed pressure of from about 500 to about 5000 p.s.i.g. The total reaction zone product effluent is passed into a suitable high-pressure separator from which a gaseous phase rich in hydrogen is removed and recycled to combine with fresh hydrocarbon charge. The remaining normally liquid product effluent is then introduced into a suitable fractionator or stripping column for the purpose of removing hydrogen sulfide and light paraffinic hydrocarbons including methane, ethane and propane. Although the normally gaseous phase from the high-pressure separator may be treated for the purpose of removing the ammonia formed as a result of the destructive removal of nitrogenous compounds, a more convenient method involves the introduction of water upstream from the high-pressure separator, removing said water and absorbed ammonia via suitable liquid level control means disposed in said high-pressure separator.

The following example is presented for the purpose of illustrating the beneficial effects afforded a process for the hydrorefining of petroleum crude oils, through the utilization of a catalytic composite prepared in accordance with the method hereinbefore set forth. It is understood that the present invention is not intended to be limited, beyond the scope and spirit of the appended claims, to the operating conditions, reagents and/or concentrations as utilized within the example. The petroleum crude oil utilized was a sour Wyoming crude having a gravity, °API at 60° F., of 22.0, and containing about 2700 p.p.m. of total nitrogen, about 2.8% of sulfur (calculated as the element) and 100 p.p.m. total metals (nickel and vanadium), the heptane-insoluble, asphaltenes portion being in an amount of about 8.37% by weight. In the example, reference is made to a relative activity coefficient, and to a standard relative activity test procedure, from which the relative activity coefficient is derived. The test procedure is conducted as hereinafter set forth.

Catalyst test procedure

The Standard Relative Activity test procdure, employed herein to determine the Relative Activity Coefficient (RAC) of a catalytic composite, is based upon the conversion of heptane-insoluble asphaltenic hydrocarbons contained in a 650° F.-plus Wyoming sour crude oil. In the test procedure, the degree of conversion is made a function of liquid hourly space velocity (LHSV).

Catalyst to be tested is disposed in a ⅞-inch (nominal internal diameter) reactor in alternate layers of 10.0 cc. of catalyst and 2.0 cc. of 60–80 mesh sand. A total of 150.0 cc. of catalyst is employed, and a quartz-chip preheat section is used above the first layer. The reactor is pressured to 3,000 p.s.i.g. with a circulating stream of hydrogen, and the inlet catalyst temperature slowly raised to a level of 300° C. while maintaining this temperature, the recycle rate is established at 25,000 s.c.f./bbl. and the crude oil is introduced. After about 300 grams of charge stock have passed through the catalyst, the catalyst inlet temperature is increased to the test temperature of 380° C. Three test periods, of four-hour duration each, are conducted with varying LHSV of 0.5, 1.0 and 2.0, all other conditions being maintained constant. The liquid product effluent, collected over each four-hour test period, is analyzed for residual heptane-insoluble content. The results are plotted on semi-logarithmic scales versus the space velocity employed. The slope of the resulting straight line is then utilized in determining the RAC of the test catalyst. The ratio of the slope from the test catalyst, to that of the standard catalyst (multiplied by a factor of 100) is the RAC of the test catalyst. Generally, an RAC of 100 is assigned to the standard catalyst. It will be readily ascertained that a test catalyst having an RAC greater than 100 is more active relative to asphaltene conversion. The Standard Relative Activity test procedure can also be employed in comparing a variety of test catalysts with one another provided the same standard catalyst is used in all cases.

Example

A series of experimental catalyst were made, each of which contained 2.0% by weight of nickel and 16.0% by weight of molybdenum. Various compositions of the carrier material were, however, utilized. These included 12.0% by weight of alumina and 88.0% by weight of silica; 37.0% by weight of alumina and 63.0% silica; 63.0% alumina and 37.0% silica; 88.0% alumina and 12.0% silica; and, 68.0% alumina, 10.0% silica and 22.0% boron phosphate. All of the catalysts were individually subjected to an activity test designed primarily to indicate nitrogen-removal activity. In this particular activity test, conducted substantially according to the asphaltene-conversion test hereinabove described, the charge stock is an asphaltene-free (so as not to mask the results relative to nitrogen removal) gas oil having an end boiling point of about 900° F., and containing 1143 p.p.m. of nitrogen and 2.28% by weight of sulfur. The results of this activity test indicated that the most active catalytic composite was that which utilized alumina, silica and boron phosphate as the carrier material. It was decided, therefore, to employ this catalyst as the "Standard" in the Relative Activity Test for asphaltene conversion.

The standard reference catalyst, designated as catalyst A, was prepared by commingling 3,260 grams of aluminum chloride hexahydrate dissolved in 3260 milliliters of water, with 354 grams of acidified N-brand water glass diluted with 354 grams of water. The mixture was added with vigorous stirring to 3400 milliliters of ammonium hydroxide, the final pH of the precipitated mixture being 8.2. The resultant hydrogel was filtered and washed free of sodium ions at a temperature of about 190° F. The filter cake was re-slurried with a phosphoric acid-boric acid solution consisting of 136 grams of boric acid in 750 milliliters of water, and 245 grams of an 87.0% by weight solution of phosphoric acid. The hydrogel slurry was then dried at a temperature of about 250° F., and calcined at a temperature of 1100° F. for a period of one hour. This carrier material consisted of 68.0% by weight of alumina, 12.0% by weight of silica and 22.0% by weight of boron phosphate. An impregnating solution was prepared utilizing 270 grams of an 85.0% by weight solution of molybdenum oxide dissolved in one liter of water and 225 milliliters of ammonium hydroxide; 95 grams of nickel nitrate hexahydrate dissolved in 85 milliliters of ammonium hydroxide completed the impregnating solution. The solution was utilized to impregnate 900 grams of the boron phosphate-containing alumina-silica carrier material hereinabove described, the resulting slurry being dried at a temperature of 250° F. for two hours, and calcined in an atmosphere of air for a period of one hour at a temperature of 1100° F.

In accordance with the method of the present invention, catalyst B was prepared by following the procedure for catalyst A through the impregnating technique and initial drying at 250° F. The dried composite was then subjected to calcination at a temperature of 700° F., which temperature was maintained for a period of one hour until substantially all the nickel nitrate had decomposed. The calcination temperature was increased to 1100° F. and held at this level for one hour.

Both catalysts were individually subjected to the Standard Relative Activity test, for asphaltene conversion, previously described. Catalyst A was arbitrarily designated the reference catalyst with an RAC of 100. Upon comparing the slope of the line plotted for catalyst B, the RAC was determined to be 150. Following an additional thirty-one hours of operation, catalyst B was again tested by varying the liquid hourly space velocity, and the RAC was found to be 160, a reasonably good check of the first figure of 150.

The foregoing specification and example serves to illustrate the benefits afforded the hydrorefining of asphaltenic charge stocks through the use of the catalytic composite prepared according to the method of the present invention.

I claim as my invention:

1. A method for the preparation of a hydrorefining catalyst which comprises the steps of:
    (a) initially preparing a calcined carrier material containing alumina, silica and boron phosphate;
    (b) impregnating said calcined carrier material with an aqueous mixture of nickel nitrate hexahydrate and molybdic acid;
    (c) drying the resulting impregnated composite;
    (d) calcining the dried composite in an oxygen-containing atmosphere at a temperature within the range of 500° F. to about 900° F. and at a level at least as high but not more than about 200° F. higher than the decomposition temperature of nickel nitrate hexahydrate; and,
    (e) increasing the calcination temperature, after substantially complete decomposition of said nickel nitrate hexahydrate, to a level higher than the calcination temperature of step (d) and within the range of from 900° F. to about 1200° F.

2. A process for hydrorefining a hydrocarbonaceous charge stock containing organo-metallic compounds and asphaltenes, which comprises reacting said charge stock and hydrogen at a temperature in the range of from about 650° F. to about 850° F. and a pressure of from about 500 to 5000 p.s.i.g., and in contact with a catalytic composite prepared in accordance with the method of claim 1.

References Cited

UNITED STATES PATENTS

| 2,889,287 | 6/1959 | Scott | 252—458 |
| 3,113,096 | 12/1963 | White | 208—217 |
| 3,169,827 | 2/1965 | De Rosset | 208—216 |
| 3,278,421 | 10/1966 | Gatsis | 208—216 |

DELBERT E. GANTZ, Primary Examiner

GEORGE J. CRASANAKIS, Assistant Examiner

U.S. Cl. X.R.

208—253; 252—432, 437